US007996493B2

(12) United States Patent
Hill (10) Patent No.: US 7,996,493 B2
(45) Date of Patent: Aug. 9, 2011

(54) FRAMEWORK FOR MANAGING CLIENT APPLICATION DATA IN OFFLINE AND ONLINE ENVIRONMENTS

(75) Inventor: David P. Hill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 11/076,721

(22) Filed: Mar. 10, 2005

(65) Prior Publication Data
US 2006/0206583 A1    Sep. 14, 2006

(51) Int. Cl.
G06F 15/16    (2006.01)
(52) U.S. Cl. ........................................ 709/218
(58) Field of Classification Search .................. 709/218; 707/8, 218
See application file for complete search history.

(56) References Cited

U.S. PATENT DOCUMENTS

| | | | | |
|---|---|---|---|---|
| 6,721,871 | B2 * | 4/2004 | Piispanen et al. | 712/1 |
| 7,219,304 | B1 * | 5/2007 | Kraenzel et al. | 715/755 |
| 7,305,475 | B2 * | 12/2007 | Tock | 709/227 |
| 2003/0158947 | A1 * | 8/2003 | Bloch et al. | 709/227 |
| 2005/0076087 | A1 * | 4/2005 | Budd et al. | 709/206 |
| 2006/0026268 | A1 * | 2/2006 | Sanda | 709/221 |
| 2007/0083486 | A1 * | 4/2007 | Bloch et al. | 707/1 |
| 2008/0201362 | A1 * | 8/2008 | Multer et al. | 707/103 R |

OTHER PUBLICATIONS

"TCP User Timeout Option" Eggert, L. Gont, F. Internet Engineering Task Force (IETF). Internet-Drafts. Oct. 22, 2004 <http://tools.ietf.org/html/draft-eggert-gont-tcpm-tcp-uto-option-01>.*

* cited by examiner

*Primary Examiner* — Benjamin R Bruckart
*Assistant Examiner* — Noel Beharry
(74) *Attorney, Agent, or Firm* — Workman Nydegger (57) ABSTRACT

A multi-phase synchronization framework allows developers to develop smart client applications that can operate efficiently in offline and online modes. For example, a client application receives user input, and generates an object that includes the user input data, as well as some associated logic for one or more phases in the synchronization framework. The object can then be passed to the synchronization framework, which communicates a service request based on the object to a target application service only when the target application service is effectively online, generally as defined by the associated logic. Whether the target application service is effectively online can also be based on default settings. The synchronization framework handles state for the object, and communicates failure and/or success to the client application. As such, the functionality for treating failed or successful communication is handled generally by the synchronization framework, rather than necessarily the client application.

19 Claims, 3 Drawing Sheets

FRAMEWORK FOR MANAGING CLIENT APPLICATION DATA IN OFFLINE AND ONLINE ENVIRONMENTS

CROSS-REFERENCE TO RELATED APPLICATIONS

N/A

BACKGROUND OF THE INVENTION

1. The Field of the Invention

This invention relates to systems, methods, and computer program products for managing application data that is used in both offline and online connection environments.

2. Background and Relevant Art

As computerized systems have increased in popularity, so also have the needs to distribute files and processing resources of computer systems in networks both large and small. In general, computer systems and related devices communicate information over a network for a variety of reasons, whether, for example, to simply exchange personal electronic messages, to sell merchandise, provide account information, and so forth. One will appreciate, however, that as computer systems and their related applications have become increasingly more sophisticated, the challenges associated with sharing data and resources on a network have also increased.

In general, computer systems often share data using applications at corresponding sending and receiving (or target) computer systems that send and receive the data. To communicate the data, the application at the sending computer system may generate data, such as by receiving input from a user or other module, or as a result of processing some other request. The application at the sending computer system then sends the data to the other target computer system on the network, often by sending the data through a transmission control protocol ("TCP") oriented connection with the other computer. Assuming that the receiving (or target) computer system has a valid connection with the sending computer system, the receiving computer system receives the data, unpacks the data, and processes the data as needed. The data can include a request to which the receiving (or target) computer system is asked to reply in a separate operation.

Not all applications, however, are necessarily configured for connection oriented communication with other applications or other modules at other computer systems. Furthermore, some applications are configured for connection oriented communication over any number of communication protocols. Still further, some applications are configured for "online" and "offline" operations, regardless of the connection or non-connection oriented protocol. By way of explanation, the term "online" will refer to situations in which an application at a sending computer system has a valid (or appropriate) connection to a target service application at a target computer system.

By contrast, "offline" will refer to the situation in which the application at the sending computer system does not have a valid (or appropriate) connection with the target service at the target computer system. For example, a connection may not be possible at the moment between computer systems, or the connection may be sufficiently weak that it is effectively offline for the purposes of the type or size of data that needs to be communicated. Thus, the sending computer system may be connected on a network generally, and may still be online or offline with respect to the target application or target computer system. For example, a personal computer on a corporate network may be connected to the web server, but if the email server is down or unable to handle requests, the personal computer may be connected on the network, but "offline" with respect to the email server.

Client applications that can operate in both offline and online scenarios can be fairly complicated to develop since they can require the implementation of a complex set of logic for determining when a target application is online or offline (or effectively offline) with respect to the client application, and how to behave in the relevant situation. In particular, applications that are configured to work in both offline and online scenarios typically implement modules that take the application down two or more decision trees. For example, at some point, a module in the application has to make a determination if the target application service is available, or if the target application service is effectively unavailable. If the target application service is available, the application allows the user to use certain application functionality, and if the target application service is unavailable, the application makes other functionality available to the user. For example, the application may store the generated data, and continually try to send the message and get a response. Generally, these two lines of functionality will require at least some guidance from the user.

Unfortunately, this is inefficient for a number of reasons. For example, the application may indicate it is online with the target application or computer system, but the connection may be of such high latency that the packets will not get to the target application as quickly as needed. This sort of latency information is not normally provided to the user. Furthermore, offline/online-capable applications are typically configured with code (which also usually differs from one application to another) that becomes increasingly more complex when the connection type can be characterized at less than fully connected, but not fully disconnected. These issues can create a number of difficulties, particularly when the code for dealing with these situations is left primarily to the respective application developers, such that the code is not only complex, but different for each respective application.

Accordingly, an advantage in the art can be realized with systems, methods, and computer program products that provide applications with the ability work in both offline and online environments with relative ease. In particular, an advantage can be realized with such that allow for a common platform that allows multiple applications to easily deal with offline/online decisions, and allows such without necessarily requiring a significant amount of guidance from the user.

BRIEF SUMMARY OF THE INVENTION

The present invention solves one or more of the foregoing problems in the art with systems, methods, and computer program products configured to provide a uniform platform through which any client application can communicate data with a target application service in an efficient manner that accommodates any number of differences in connection status. In particular, implementations of the present invention relate to a pluggable, extensible framework that allows data to be communicated to a target service with different sets of logic in a single object.

For example, in accordance with at least one implementation of the present invention, a method from the perspective of an online/offline-capable client application comprises receiving data from a user, and identifying a logic component to be associated with the data. The logic component can include one or more elements that indicate how the data input by the user are to be treated in a synchronization framework. The method also comprises creating an object that includes the data received from the user, and that includes the logic component that is associated with the data.

The method further comprises passing the object to the synchronization framework, such that the synchronization framework communicates with the target application service in an efficient manner that accommodates changes in connection status. For example, the client application passes the object to the synchronization framework, thereby relegating functions of administering communication successes and failures to the synchronization framework, which also handles any required changes in behavior as a result of connection state. The method also comprises receiving a response from the synchronization framework, such as whether the object was communicated successfully or not.

From the perspective of a synchronization manager, a method in accordance with at least one implementation of the present invention comprises accessing an object, which includes data generated through a client application, as well as associated object logic. Generally, upon accessing the object, and when a target application service is effectively offline, the synchronization manager saves the object to a local store, and uses the object logic to identify a likelihood of transmission success. When the synchronization manager has determined that the target application service is effectively online, the synchronization manager sends a corresponding request to a target application service over a network, and receives a response from the target application service.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products configured to provide a uniform platform through which any client application can communicate data with a target application service in an efficient manner that accommodates any number of differences in connection status. In particular, implementations of the present invention relate to a pluggable, extensible framework that allows data to be communicated to a target service with different sets of logic in a single object.

As will be understood from the present specification and claims, one aspect of the invention relates to a multi-phase, online/offline synchronizing framework (or "synchronization framework") that can be used to communicate data between one or more client applications and one or more target network services in an efficient manner. In general, a synchronization framework will be understood for the purposes of this specification and claims as a system that provides support for ensuring that data on the sending system is handled appropriate with respect to data on target system by way of managing the requests and data sent between the two.

In any event, a client application can be used for generating related data for a request, as well as logic that can be used in each phase of the multi-phase framework. The generated data and associated logic are included in a single data object. The synchronization manager of the synchronization framework 150 then access the object (or batches of objects), and communicates a corresponding request(s) to the target network service (or "target application service") when an appropriate connection is available. One will appreciate that the framework and implementations described herein allow client applications to efficiently operate in both online and offline modes using a common, pluggable, and extensible framework.

Figure 1:
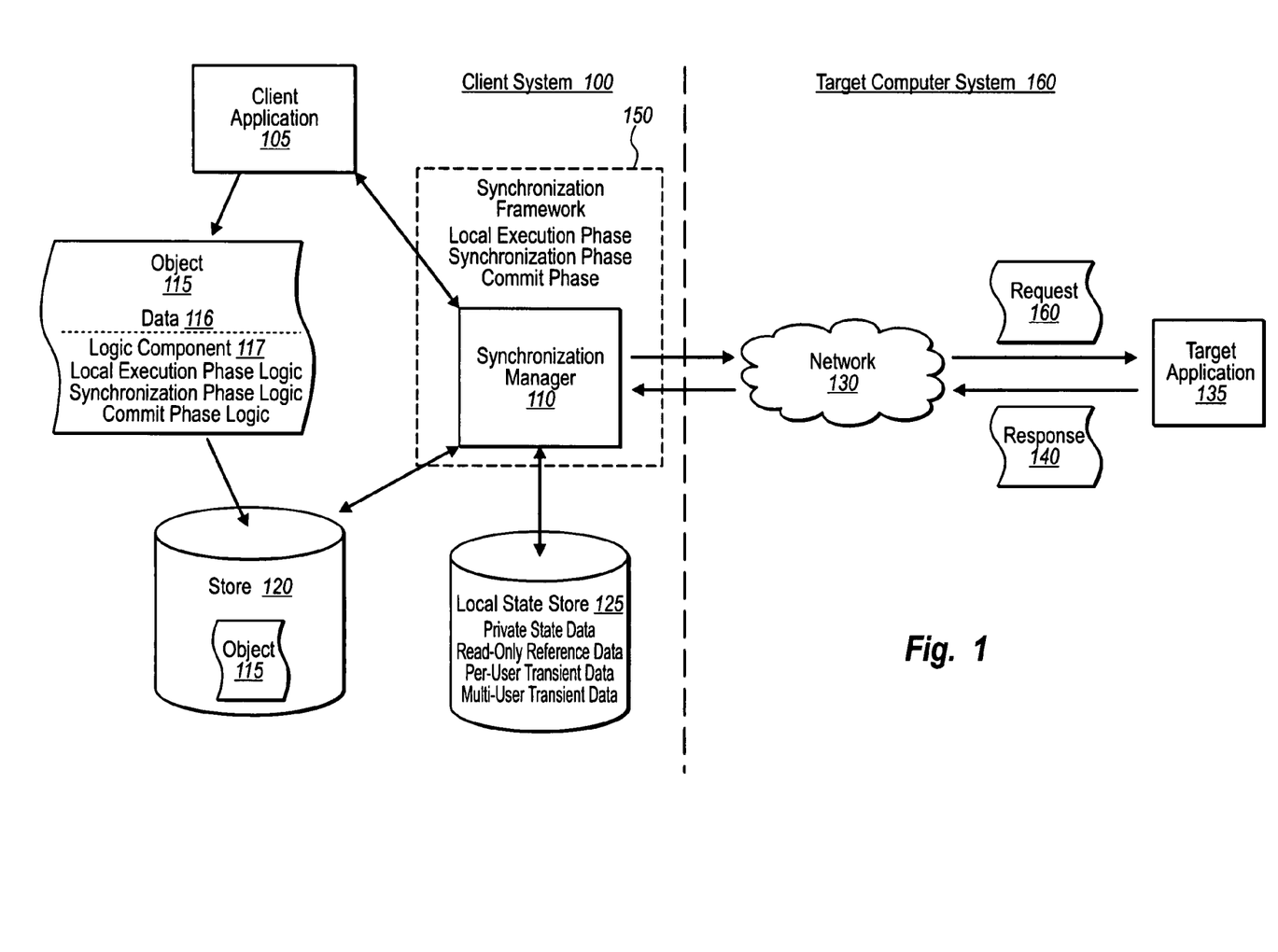
FIG. 1 illustrates a schematic overview in accordance with at least one implementation of the present invention in which a client application and synchronization manager framework are used to communicate requests that correspond to the objects to a target application service.

For example, FIG. 1 shows a schematic overview of at least one implementation of the present invention in which data is communicated from a client application 105 to a target application service 135 at a target computer system 160 using a synchronization framework 150. In particular, FIG. 1 shows that a client application 105 generates a data object 115. In general, the client application 105 is any application program that is configured to operate in both offline and online connectivity environments. The client application 105 generates the object 115 in response to any number of inputs, such as user input through a user interface, or as a result of input received from another program or module at the client computer system 100. For example, the client application 105 may be an application used to receive input from a user regarding a purchase order, which ultimately is intended to be passed to a network application, such as target application 135, which is configured to process the order.

When the client application 105 receives input, the client application 105 creates a single data object 115, which will be accessed by a synchronization manager 110. The data object 115 includes at least a data representation 116 of the user input, as well a logic component 117 corresponding to one or more phases of a multi-phase synchronization framework (i.e., synchronization framework 150). For purposes of description herein, the multi-phase synchronization framework 150 will be described as having essentially three phases: a local execution phase, a synchronization phase, and a commit phase. One will appreciate, however, that these phases are merely exemplary, and that other implementations may include greater, or fewer, numbers of phases, so long as the phases are integrated in a synchronization framework 150. Nevertheless, FIG. 1 shows that object 115 includes logic elements for a "local execution phase", a "synchronization phase", and a "commit phase".

In general, the local execution phase encapsulates the gathering and validation of the target application service 135 requests input parameters, and the initial processing of the request. For example, assuming that the target application service 135 is effectively "offline", the local execution phase logic provides information regarding how the synchronization manager 110 will receive data 116 from a client application 105 into an object 115, where to store the object 115 once it is created, what values to use for other logic elements associated with the object 115, and/or how to recognize local state for the object at the computer system 100. In particular, the local execution phase logic may indicate that object 115 that is pending by presenting a "pending" icon or text indicator in a user interface of the application program 105. Thus, the local execution phase will require the client application 105 (and/or synchronization manager 110) to make some kind of tentative state changes prior to the actual processing of the corresponding service request 160 by the target application 135.

By contrast, the synchronization phase relates primarily to the execution of a request using an appropriate communication protocol. In particular, the synchronization phase relates in at least one aspect to the parameters related to sending a service request 160 based on the object data to the target application service 135 for processing. For example, the synchronization phase can include parameters of how to treat certain types of connections (or lack thereof) with the target application service 135. Furthermore, the synchronization phase logic 117 can be used to determine when target application service 135 is effectively "online" or effectively "offline". The synchronization phase can also be responsible for retrieving and storing the parameters of a request, so that they can be processed subsequently in the commit phase.

The commit phase relates primarily to the completion of processing a successful service request at the client computer system 100. For example, assuming a successful communication to, and execution of, a service request 160 based on the data of object 115 at the target application service 135, the commit phase of the synchronization framework 150 involves at least confirming tentative state changes made for the object 115 during the local execution phase. In some cases, the commit phase may also dictate that an indicator is sent to the client application 105 indicating that the object 115 was processed successfully. The indicator may, in turn, cause an icon at a corresponding user interface to change from "pending" to "completed".

Alternatively, if a response from the target application service 135 indicates that the object 115 was not processed successfully, the commit phase may be deferred in lieu of a repeat of logic in the synchronization phase. Similarly, if a request failed, then the commit phase may roll back any tentative state changes regarding the object 115, and execute any necessary clean up of logic. For example, the commit phase logic may require that the data of unsuccessfully processed (or non-processed) service request 160 are re-associated with a new set of object logic in a new object (not shown).

Accordingly, a client application 105 encapsulates each object 115 with corresponding logic sufficient to direct the actions of a synchronization manager 110 in each phase of the synchronization framework 150. In general, the synchronization manager 110 is any program or module suitable for interfacing with the client application 105. The synchronization manager 110 is also any program or module configured for executing the phases and requests in the synchronization framework 150 in accordance with the logic component 117 of object 115.

For example, in one implementation, the synchronization manager 110 interacts with the target application service 135 at the target computer system 160 to identify whether the target application service 135 is effectively online or offline with respect to rules inherent in the object 115, or required independently by the client application 105. In one instance, this involves the synchronization manager 110 iteratively sending connection request/response messages to the target application 135. The determination of effectively online or offline can depend, for example, on the speed or frequency of the response (or lack thereof over some prescribed time frame) from the target application service 135, or the like. Thus, in some cases, the synchronization manager 110 can provide a relatively immediate indication whether the target application service 135 is online or offline when the object 115 is created.

As such, when the client application 105 creates the object 115, the client application 105 may have an immediate indication that the target application 135 is effectively online. The synchronization manager 110 can then cache the object 115, along with any state associated with the object 115, and send a service request 160 related to the data of object 115 directly to the target application service 135. In addition, the synchronization manager 110 and framework 150 are also configured to handle the outgoing service requests 160 and responses 140 in light of any number of failure events. For example, even if the synchronization framework has determined that the client application is most likely online, and that a service request is likely to succeed, any failure of the actual service request can be handled by the synchronization framework itself (either by re-queuing the request object or by retrying the request a certain number of times) without the client having to implement complex application logic.

Alternatively, if the synchronization manager 110 has determined at that time that the connection is effectively offline in regard to the logic indicated in the object 115, then the synchronization manager 110 passes the object 115 to a store 120. The synchronization manager 110 also changes any state information in the object 115 to "pending", and relays this state information to a local state store 125. If the object logic so indicates, the synchronization manager 110 may also pass an indication that the object 115 is tentative, or pending, to the client application 105. The client application 105 can then reflect this status information to the user in a user interface, as previously indicated.

By way of explanation, there can be many types of local "state" information used with reference to an object 115. For the purposes of this description and claims, however, some exemplary forms of state that may be stored locally in local state store 125 include "private state data", "read-only reference data", "per-user transient data", and "multi-user transient data". In general, "private state data" comprises data that is internal to the client application 105. Data such as this typically comprises no dependency on any other system, and has a schema and management that are under the control of the client application 105.

By contrast, "read-only reference data" includes data that may have varying degrees of volatility (though not normally changed by the client application 105), such that some read-only data hardly ever changes, while other read-only data changes frequently, and requires frequent cache updates. Client application (e.g., 105) that explicitly go offline for a specified period of time can be configured to continually forcing synchronization, to ensure the read-only reference data are always up to date. The read-only reference data may also be annotated with a range of information to help the target application 135 anticipate potential conflicts, and thus minimize the number of rejected service requests.

"Per-user transient data" includes data that pertains to a specific user, and is visible to other client applications and client systems in some form. Per-user transient data is also editable only by the user and/or corresponding client application (e.g., 105) to which it pertains. Per-user transient data can be easily cached by the client application 105 without danger that some other user or other client application will modify it. "Multi-user transient data", by contrast, is data which can be edited by many different users or client applications. Multi-user transient data can be edited by multiple users simultaneously, can be used for validation purposes of an object 115, and can be used to form requests of a target application service 135. If the multi-user data is out of date, or has been edited by somebody else in the meantime, then the user may be given the opportunity to correct any errors to help the appropriate task proceed.

One can appreciate, therefore, that it can be important in some cases to ensure proper organization and maintenance of the different types of local state information, in order to ensure the appropriate data are kept up to date, and to avoid conflicts during execution of one or more phases in the synchronization framework 150. As such, in at least one implementation, FIG. 1 shows that the synchronization manager 110 manages the various local state information in a single location, such as local state store 125. In at least one implementation, the local state store 125 allows management of multiple local state data changes whether the target application service 135 is online or offline.

Referring still to FIG. 1, the synchronization manager 110 coordinates the storage of the object 115, and ultimate object retrieval and sending functions, as defined in the attached logic 117. In one implementation, the synchronization manager 110 processes object 115 by instituting additional executable modules, such as by using a "task handler", and/or an "operation handler", which are used to encapsulate the object 115. In general, a task handler is a module that describes how an object event should be handled for a given phase. The task handler can be, in some implementations, the primary point of interaction between the client application 105 and the multi-phase offline framework. The task handler can also be responsible for providing a simple application program interface ("API") to the client application 105, and for managing the details of the individual request to the target application service 135.

An operation handler, by contrast, is an executable module that is a subset operation of a given task module, and is a generic term for the object 115 components that encapsulate the data 116 and logic 117 required to make a single service request as described in the previous sections. In particular, operation handlers are responsible for performing the service requests, and for making any local state changes (offline or online) associated within a given operation in a task. For example, if the client application 105 is executing a task offline, but decides to abandon the task before the synchronization phase, then the already-executed operations, which may have affected local state, may be asked to roll back the changes to the local state. In such a case, the given operation handler may send an additional message to the target application service 135 that the given operation has been "rolled back".

In any event, the synchronization manager 110 implements any number of processes, components or modules to manage objects (e.g., 115), state data, and to implement the logic in each object (e.g., object 115). For example, the synchronization manager 110 can ask task and/or operation handler to access object logic related to the synchronization phase, and then use accessed logic as a guide for determining whether the target application service 135 is effectively online or effectively offline. For example, the synchronization phase logic element of logic component 117 may direct the synchronization manager 110 to ascertain online or offline status only in response to a user's selection of an item through a user interface corresponding to the client application 105. In other cases, the synchronization phase logic might direct the synchronization manager 110 to ping the target application service 135 using a remote procedure call ("RPC"), using the distributed component object model ("DCOM"), or some other generic "web services" call.

As previously indicated, the synchronization logic element of the logic component 117 can also specify such things as the amount of times pinging should occur during a given time frame, as well as the amount of responses (or types of responses) needed to properly ascertain whether the target application service 135 is effectively online or effectively offline. For example, a smaller object 115 that can be communicated at any time may only require a single acknowledgement (or "ack") from the target application service 135 in a few seconds of pinging. By contrast, a larger object 115, which may need to be communicated more immediately might require multiple "acks" within fractions of a second. Accordingly, the developer can still have some input into how online or offline connectivity is treated (by including certain rules in the synchronization logic), without necessarily having to encode multiple permutations for specifically treating each type of scenario.

Continuing with FIG. 1, once the synchronization manager 110 has determined that the target application service 135 is effectively online for the purposes of sending service request 160, the synchronization manager 110 pulls the object 115 from the store 120. The synchronization manager 110 then sends the corresponding service request 160, which is based in part on the object 115 data 116, to the target application service 135 using an established communication mechanism, such as by a TCP connection with the target application 135. FIG. 1 also shows that the target application 135 sends a response 140 to the synchronization manager 110. For example, upon receiving and/or processing the service request 160 of the object 115, the target application 135 sends a response 140 to the synchronization manager 110. Alternatively, if the connection was identified as valid when the synchronization manger 110 sent the service request 160, but the target application 135 suddenly went offline, the response 140 might take the form of a communication failure message.

In any event, the synchronization manager 110 takes the response message 140 and performs additional actions. For example, if the communication and processing of the corresponding service request 160 was successful at the target application 135, and response 140 indicated the same, the synchronization manager 110 can initiate the commit phase of the synchronization framework 150 with respect to the commit logic of logic component 117 (of object 115). As previously indicated, this can involve a number of different actions, such as providing an indicator to the client application 105 of successful transmission and processing, which might cause the client application 105 to update a corresponding user interface. For example, the client application 105 might change a pending or tentative icon on the user interface to "completed", or the like, as dictated by the commit phase logic element in logic component 117. The commit phase logic might also indicate to the synchronization manager 110 to update the local state for object 115 in the local state store 125, as appropriate, such that the system framework does not try to send the object 115 to the target application 135 again.

Accordingly, the schema described or shown with respect to FIG. 1 provides a simple, customizable, and extensible framework that can be used by any developer when developing a client application for offline and online capabilities. The present invention, however, can also be described in terms of methods for accomplishing a method of communicating client application data generated in an offline or online environment to a target application service.

Figure 2:
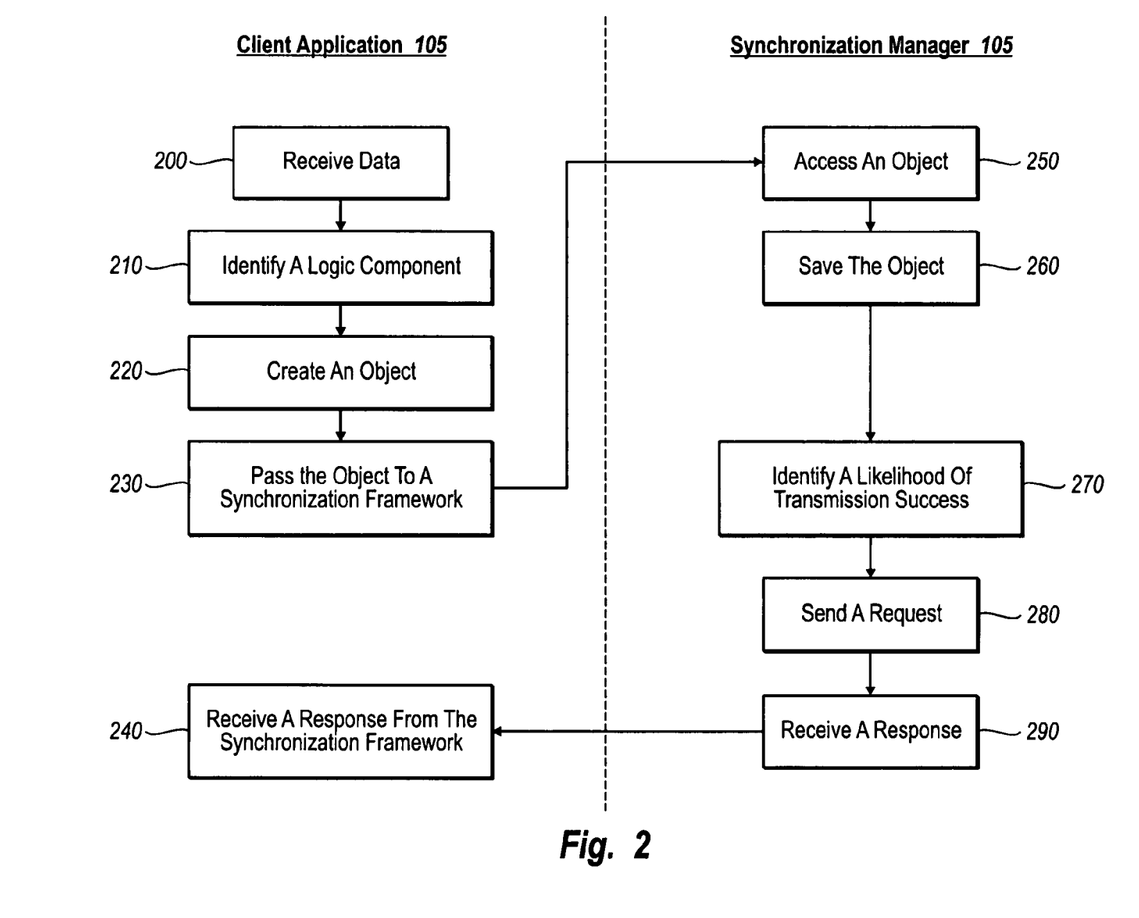
FIG. 2 illustrates methods in accordance with an implementation of the present invention that correspond to both client application and synchronization manager perspectives.

In particular, FIG. 2 illustrates methods from the client application perspective and from the synchronization manager perspective for accomplishing these methods. The methods shown in FIG. 2 are described below with reference to the applications, components, and/or modules shown in FIG. 1. For example, FIG. 2 shows that a method for managing data from the client application 105 perspective so that the data is communicated with a target application service 135 in an efficient manner comprises an act 200 of receiving data. Act 200 includes receiving data from a user. For example, during the local execution phase of a multi-phase synchronization framework, a user inputs data 116 for an order form using a user interface provided by the client application 105.

The method also comprises an act 210 of identifying a logic component. Act 210 includes identifying a logic component to be associated with the data, the logic component including one or more elements that indicate how the data are to be treated in a synchronization framework. For example, the client application 105 identifies rules for the user-generated data that include how synchronization manager 110 can identify if a target application 135 is effectively online or offline for the purposes of the object, and/or what sort of information should be reported back to the client application 105. In one implementation, the logic elements include logic for a local execution phase, logic for a synchronization phase, and logic for a commit phase of a synchronization framework.

The method from the client application 105 perspective also comprises an act 220 of creating an object. Act 220 includes creating an object that includes the data received from the user, and the logic component that is associated with the data. For example, the client application 105 creates a data object 115 that includes user input data (e.g., data from an order form), as well as local execution phase, synchronization phase, and commit phase logic elements. The logic elements for object 115 effectively customize the functions of the synchronization framework 150 without the client application 105 necessarily needing additional complex code. In particular, the object 115 allows the client application 105 to leave much of the communication success and or result mechanisms to be handled by the synchronization framework 150.

Accordingly, FIG. 2 shows that the method from the client application 105 perspective also comprises an act 230 of passing the object to a synchronization framework. Act 230 includes passing the object to the synchronization framework, such that the synchronization framework communicates a service request based on the object to a target application service in an efficient manner. For example, after creating the object 115 with data and associated logic, the client application 105 makes the object 115 accessible to synchronization manager 110, so that a corresponding service request 160 can be sent.

Thus, the method from the synchronization manager 110 perspective comprises an act 250 of accessing an object. Act 250 includes accessing an object generated by a client application configured to operate in an online or an offline mode, the object including generated data and a logic component having one or more logic elements. For example, the synchronization manager 110 accesses object 115 after it has been created by the client application 105, and before it is placed in a store 120 for an indefinite time, or ultimately sent to the target application service 135. The method from the synchronization manager 110 perspective also comprises an act 260 of saving the object. Act 260 includes saving the object to a local store. For example, the synchronization manager 110 passes the object 115 to a store 120 before performing any additional functions.

In addition, the method from the synchronization manager 110 perspective comprises an act 270 of identifying a likelihood of transmission and/or processing success. Act 270 includes identifying a likelihood of transmission and/or processing success based on the included logic component. For example, the synchronization manager 110 identifies the synchronization phase logic element of logic 117, and uses this to determine what is meant by being online or offline with a target application service 135 in the context of object 115. In one implementation, this can involve pinging the target application service 135 a number of times per some time frame, with a minimum number of reply pings received before being considered "online".

In another implementation, this can involve simply identifying that the target application 135 is considered present on a network. In short, here are a wide variety of ways, mechanisms, and limits that an application developer can set in the object logic 117 to determine what is considered effectively "online" or effectively "offline" for purposes of what is needed for object 115. Furthermore, beside simply determining transmission and/or processing success, the synchronization framework 150 can also handle failure of the actual service request 160 either by re-queuing the service request 160, or by retrying the service request 160 a certain number of times. Thus, the synchronization framework can handle a wide variety of success and failure events without the client having to implement any additional, complex application logic.

The method from the synchronization manager 110 perspective also comprises an act 280 of automatically sending a request based on the object to a target application service. Act 280 includes automatically sending a service request based on the object to a target application service over a network, such that the service request is communicated to the target application service when the target application service is effectively online. For example, after receiving a prescribed number of "acks" from the target application service 135 within a certain period of time, the synchronization manager initiates the synchronization phase of the synchronization framework 150 and sends the service request 160 from store 120 to the target application service 135.

In addition, the method from the synchronization manager 110 perspective comprises an act 290 of receiving a response. Act 290 includes receiving a response from the target application service. For example, if the target application 135 received and processed the service request 160, or if the target application 135 suddenly became unavailable (or failed for some other reason) after the service request 160 was sent, the synchronization manager 110 receives a response message 140 that corresponds to success or failure of the requested event.

Accordingly, the method from the client application 105 perspective comprises an act 240 of receiving a response from the synchronization framework. For example, if message 140 indicates success, the corresponding message from the synchronization manager 110 indicating success might cause the client application 105 to update an icon on a user interface from "tentative" to "completed". Alternatively, if response 140 indicates failure, the corresponding message of failure from the synchronization manager 110 causes the client application 105 to maintain the present "tentative" state of the icon on the user interface, or causes the client application 105 to request additional guidance from the user.

As such, the methods (and schema) described herein provide a number of efficient approaches to handing off offline and online decision making to a framework. In particular, the methods (and schema) described herein provide developers with a convenient mechanism for developing offline and online capable client applications, without requiring the developers to also develop complex algorithms for treating failed and successful communication events. In addition, the methods (and schema) described herein still provide developers with a significant amount of flexibility by allowing the developers to nevertheless define customized rules, if desired, for treating data in various phases of a framework.

Figure 3:
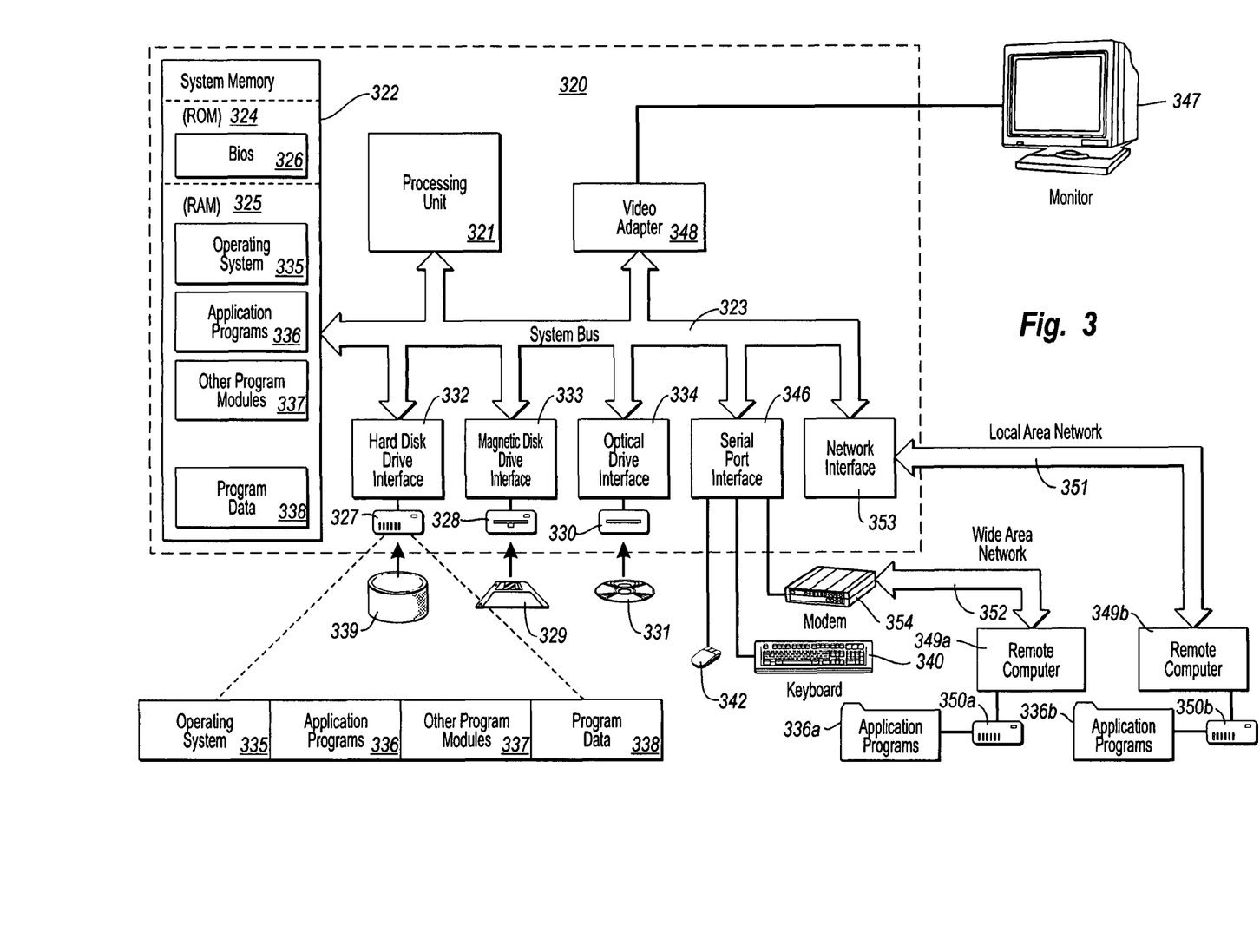
FIG. 3 illustrates a schematic overview of an exemplary computing environment that can be used for implementing one or more aspects of the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general-purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disc drive 328 for reading from or writing to a removable magnetic disk 329, and an optical disc drive 330 for reading from or writing to removable optical disc 331 such as a CD ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disc 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disc 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method performed in a client application program in a computerized environment, wherein the client application is configured to work in an online mode with a target application service, and in an offline mode, the method being for handling data produced through the client application so that the data is communicated with the target application service in an efficient manner, and the method comprising the acts of:

receiving data from a user;

identifying a logic component to be associated with the data, the logic component including one or more rule elements that indicate how a synchronization framework is to determine whether a target application is effectively online for purposes of the data, wherein the target application is effectively offline when it does not meet determined criteria, regardless of whether the target application is actually offline, and regardless of whether the client application is online;

associating the data received from the user with the logic component by creating a single object that includes not only the data received from the user, but also the logic component that is associated with the data, such that the object includes the data encapsulated with one or more rule elements providing logic describing how the synchronization framework is to determine whether the target application is effectively online for purposes of the data, and before sending a service request based on the data to the target application;

passing the object, including the data and the encapsulated one or more rule elements, to the synchronization framework, such that the synchronization framework communicates the service request based on the object to the target application service in an efficient manner; and receiving a response from the synchronization framework; wherein the logic component includes logic elements corresponding to:

a local execution phase, wherein the logic element of the local execution phase specifies how the synchronization framework will receive data from the client application into an object, where to store the object once it is created, and what values to use for other logic elements corresponding to the object, and how to recognize local state for the object at the computing system running the client application;

a synchronization phase, wherein the logic element of the synchronization phase includes parameters of how to treat certain types of connections with the target application service, including how to determine whether the target application service is effectively offline, wherein the parameters of how to treat certain types of connections are based at least in part on a size of the object; and a commit phase, wherein the commit phase includes logic for confirming tentative state changes made for the object during the local execution phase, deferring the commit phase when the object is not processed successfully, rolling back tentative state changes when a request fails, and requiring re-association of a new set of object logic when data is unsuccessfully processed, wherein the local execution phase, the synchronization phase, and the commit phase are all phases of the synchronization framework.

2. The method as recited in claim 1, further comprising creating an additional object based on additional received user input, wherein the object and the additional object are part of a batch.

3. The method as recited in claim 1, wherein the synchronization phase element identifies one or more conditions under which the target application service is effectively online or effectively offline.

4. The method as recited in claim 1, wherein the synchronization phase element identifies that the target application service is effectively online or offline based on a number, type, or frequency of response from the target application service, such that the synchronization phase element determines a likelihood of success or failure of the service request.

5. The method as recited in claim 4, wherein the response from the target application service is received after sending to the target application service at least one of an RPC, DCOM, or web service call through the synchronization framework.

6. The method as recited in claim 1, further comprising providing a first indicator to the user through a user-interface indicating that the object is pending.

7. The method as recited in claim 6, wherein the first indicator is provided based on a local execution phase logic element of the logic component.

8. The method as recited in claim 6, wherein the response from the synchronization framework indicates that the service request based on the object was received and processed successfully by the target application service, the method further comprising providing a second indicator to the user through the user-interface that the object is completed.

9. The method as recited in claim 8, wherein the second indicator is provided based on a commit phase logic element of the logic component.

10. A method performed at a synchronization manager of an offline/online framework for a client application in a computerized environment, the synchronization manager being configured to efficiently handle data generated through the client application in offline or online modes, the method being for communicating the data to the target application service in an efficient manner, and the method comprising the acts of:

accessing an object generated by a client application, the client application configured to operate in both an online and an offline mode, the object being a single object that includes generated data encapsulated with a logic component having one or more logic elements, the one or more logic elements including at least one rule that defines logic for how the synchronization manager can relatively immediately determine when a target application of a remote computing system is to be considered effectively online or offline, independent of whether the client application is online, and before sending the data to the target application;

saving the single object to a local store, such that the data and the at least one rule defining logic for how the synchronization manager can relatively immediately determine before sending a service request based on the data to the target application when the target application is to be considered effectively online or offline is jointly stored in the local store in the single object;

accessing the one or more logic components and the logic for determining when a target application is considered effectively online or offline and using such criteria to determine whether a corresponding target application is effectively online for purposes of the data, wherein determining whether a corresponding target application is effectively online includes relatively immediately identifying a likelihood of successfully transmitting the object to the corresponding target application based on logic included in the logic component, and wherein the target application is effectively online if the identified likelihood of successfully transmitting the object exceeds a threshold level, such that the target application can be deemed effectively offline regardless of whether it is actually offline;

automatically sending the service request based on the object to the target application service over a network, such that the service request is communicated to the target application service only when the target application service is effectively online; and receiving a response from the target application service;

wherein the logic component includes logic elements corresponding to:

a local execution phase, wherein the logic element of the local execution phase specifies how the synchronization framework will receive data from the client application into an object, where to store the object once it is created, and what values to use for other logic elements corresponding to the object, and how to recognize local state for the object at the computing system running the client application;

a synchronization phase, wherein the logic element of the synchronization phase includes parameters of how to treat certain types of connections with the target application service, including how to determine whether the target application service is effectively offline, wherein the parameters of how to treat certain types of connections are based at least in part on a size of the object; and a commit phase, wherein the commit phase includes logic for confirming tentative state changes made for the object during the local execution phase, deferring the commit phase when the object is not processed successfully, rolling back tentative state changes when a request fails, and requiring re-association of a new set of object logic when data is unsuccessfully processed, wherein the local execution phase, the synchronization phase, and the commit phase are all phases of the synchronization framework.

11. The method as recited in claim 10, wherein the response from the target application service includes an identifier of a success or failure result, the method further comprising passing the result to the client application.

12. The method as recited in claim 11, wherein the result is passed to the client application as a result of one of the synchronization manager interacting directly with the generated data of the object, and a component of a synchronization framework through which the synchronization manager interacts passing the success or failure result to the client application.

13. The method as recited in claim 10, further comprising identifying one or more state values associated with the object, and saving the state values for the object in a local state store.

14. The method as recited in claim 13, further comprising accessing a different object generated by the client application, and saving one or more different state values associated with the different object in the local state store.

15. The method as recited in claim 14, wherein the object and the different object comprise a batch, such that the synchronization manager determines whether to send the service request based on the object and a different service request based on the different object at the same time.

16. The method as recited in claim 10, wherein the object logic comprises a local execution phase logic element, a synchronization phase logic element, and a commit phase logic element.

17. The method as recited in claim 16, wherein identifying the likelihood of transmission or of processing success by the target application service includes an act of determining that the target application service is effectively online or offline.

18. The method as recited in claim 17, wherein the synchronization manager determines whether the target application service is effectively online or offline based on the synchronization phase element, the synchronization phase element indicating a number, type, or frequency of response from the target application service, or a success parameter indicating the success or failure of the processing of the service request.

19. In a computerized environment in which a client application communicates data works in offline or online modes, a one or more computer readable media having computer-executable instructions stored thereon that, when executed, cause one or more processors to perform a method of handling data produced through the client application so that the data is communicated with the target application service in an efficient manner, comprising the following:

receiving data from a user;

identifying a logic component to be associated with the data, the logic component including one or more rule elements that indicate how a synchronization framework is to determine whether a target application is effectively online for purposes of the data, wherein the target application is effectively offline when it does not meet determined criteria, regardless of whether the target application is actually offline, and regardless of whether the client application is online;

associating the data received from the user with the logic component by creating a single object that includes not only the data received from the user, but also the logic component that is associated with the data, such that the object includes the data encapsulated with one or more rule elements providing logic describing how the synchronization framework is to determine whether the target application is effectively online for purposes of the data, and before sending a service request based on the data to the target application;

passing the object, including the data and the encapsulated one or more rule elements, to the synchronization framework, such that the synchronization framework communicates the service request based on the object to the target application service in an efficient manner; and receiving a response from the synchronization framework;

wherein the logic component includes logic elements corresponding to:

a local execution phase, wherein the logic element of the local execution phase specifies how the synchronization framework will receive data from the client application into an object, where to store the object once it is created, and what values to use for other logic elements corresponding to the object, and how to recognize local state for the object at the computing system running the client application;

a synchronization phase, wherein the logic element of the synchronization phase includes parameters of how to treat certain types of connections with the target application service, including how to determine whether the target application service is effectively offline, wherein the parameters of how to treat certain types of connections are based at least in part on a size of the object; and a commit phase, wherein the commit phase includes logic for confirming tentative state changes made for the object during the local execution phase, deferring the commit phase when the object is not processed successfully, rolling back tentative state changes when a request fails, and requiring re-association of a new set of object logic when data is unsuccessfully processed, wherein the local execution phase, the synchronization phase, and the commit phase are all phases of the synchronization framework.

* * * * *